3,165,304
SHAFT KILN
Aage M. Tvergaard, Albert H. Pack, and William W. Campbell, Ludington, Mich., and Earl Leatham, Wexford, Pa., assignors to Harbison-Walker Refractories Company, Pittsburgh, Pa., a corporation of Pennsylvania
Filed Jan. 14, 1963, Ser. No. 251,415
12 Claims. (Cl. 263—29)

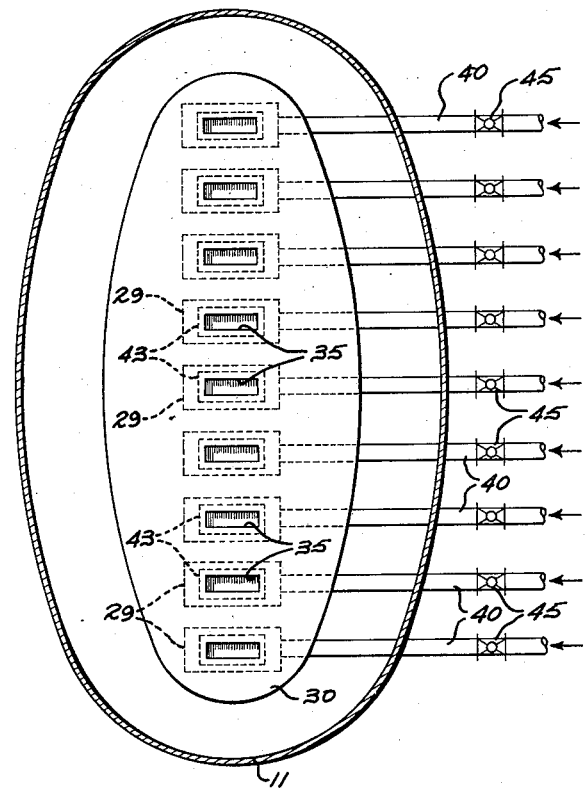

This invention relates to the construction of shaft kilns for operation at very high temperatures. More particularly it relates to improved shaft kiln construction suitable for dead burning magnesite and the like.

The art of kiln construction is very old and the literature, particularly the patent literature, is replete with suggested constructions and methods of operation for kilns. One segment of the art of kiln construction or design relates to what is sometimes termed shaft kiln design. Shaft kilns are usually vertical kilns in which a charge of material to be treated is passed downwardly through the open top of the kiln in counter-current flow to an upwardly moving stream of hot gas. This type of kiln has been employed most frequently in the calcining of limestone. In calcining limestone it is desired to drive off certain natural constituents to obtain a chemically reactive product. The chemical equation $$CaCO_3 + heat \rightarrow CaO + CO_2$$

is indicative of the primary reaction which occurs in the calcining of limestone.

More recently it has been suggested to dead burn magnesite and dolomite in a shaft kiln. By "dead burn" we mean burn at a very high temperature to produce a relatively non-reactive product. The art of shaft kiln construction for the calcining of limestone was, of course, considered pertinent. However, when one considers that a lime kiln in its hottest zone, is usually not above about 1400° C. or 2550° F., it becomes readily apparent that an entirely new technology had to be evolved to construct kilns for dead burning magnesite and dolomite because the required dead burning temperature for these materials is above about 3000° F. Some kilns, for dead burning magnesite and dolomite, now operate between 4000 and 5000° F. The 4000° F. figure is more applicable to dolomite.

With the lower calcining temperature for limestone it has been possible to incorporate various modes of auxiliary flow directing apparatus interiorly of the kiln. These have included sequential burning stages, one under the other in a common kiln shell, which tended to assure that all of the charge passing through the kiln was heated to at least the desired disassociation temperature of calcium carbonate. Various internal baffling arrangements have been suggested to deflect gas flow and charge movement to produce intimate admixing interiorly of the kiln. Others have suggested a plurality of juxtaposed ducts interiorly of a common shell as another means of assuring intimate association between the downwardly moving charge of limestone and the upwardly moving charge of hot gases. However, the foregoing arrangements are not suited for the operation of a kiln above about 3000° F. because the temperatures involved are beyond the range of the normally used materials of construction.

A particularly satisfactory design for the refractory lining of tubular shaft kilns of the type to which this invention relates is disclosed in co-pending U.S. patent application S.N. 203,659 filed July 19, 1962, now abandoned, owned by a common assignee. In operating kilns of the type disclosed in said co-pending application it has been found difficult to cool the product uniformly at or near the bottom discharge.

Previous shaft kilns for dead burning dolomite and magnesite have consisted of a refractory lined steel shell of the type disclosed in said co-pending application. The refractory lining was supported by a horizontally disposed annular steel plate which was in turn supported by beams welded to the steel shell. A stainless steel skirt was welded about the aperture through this annular plate and extended downwardly therefrom to (1) confine the material being discharged from the bottom of the kiln and to (2) protect the adjacent metal structural members from the radiant heat of the discharging product.

This arrangement was not entirely satisfactory. The downwardly extending skirt was subject to extensive erosion because of contact with the hot discharging material. Further, the skirt was difficult to inspect for signs of damage, particularly when the kiln operation fluctuated and the product discharged at temperatures above 2000° F. Also, above 2000° F. the skirt deformed due to softening of the metal. Furthermore, the margin of safety against catastrophic failure of the kiln bottom due to very wide fluctuations in the operation of the kiln was not as great as desired. In a kiln of this design, where the charge is supported by the discharge table only, with the table in turn held in place by the skirt, a rupture or even a large deformation of the skirt allows the charge to run off the edge of the table thus emptying the kiln into the bottom chamber. The 3000–4500° F. material thus discharged into the bottom half of the kiln can melt or otherwise cause irreparable damage to the bottom cone and the structural members which support the kiln.

Accordingly it is an object of this invention to provide improved construction for high temperature shaft kilns. It is another object of the invention to provide improved shaft kiln construction suitable for dead burning materials above about 3000° F. It is a further specific object of the invention to provide improved construction for the lower end of a vertical shaft kiln suitable for dead burning refractory materials above about 3000° F.

Other objects, and further features and advantages of this invention will become readily apparent to those skilled in the art from a study of the following detailed description with reference to the appended drawings. In these drawings:

FIG. 3 is a view taken along the line 3—3 of FIG. 1.

Before describing the drawings in detail it should be understood they are but exemplary of construction embodying the concepts of our invention, and are given by way of explanation and not by way of limitation.

Figure 1:
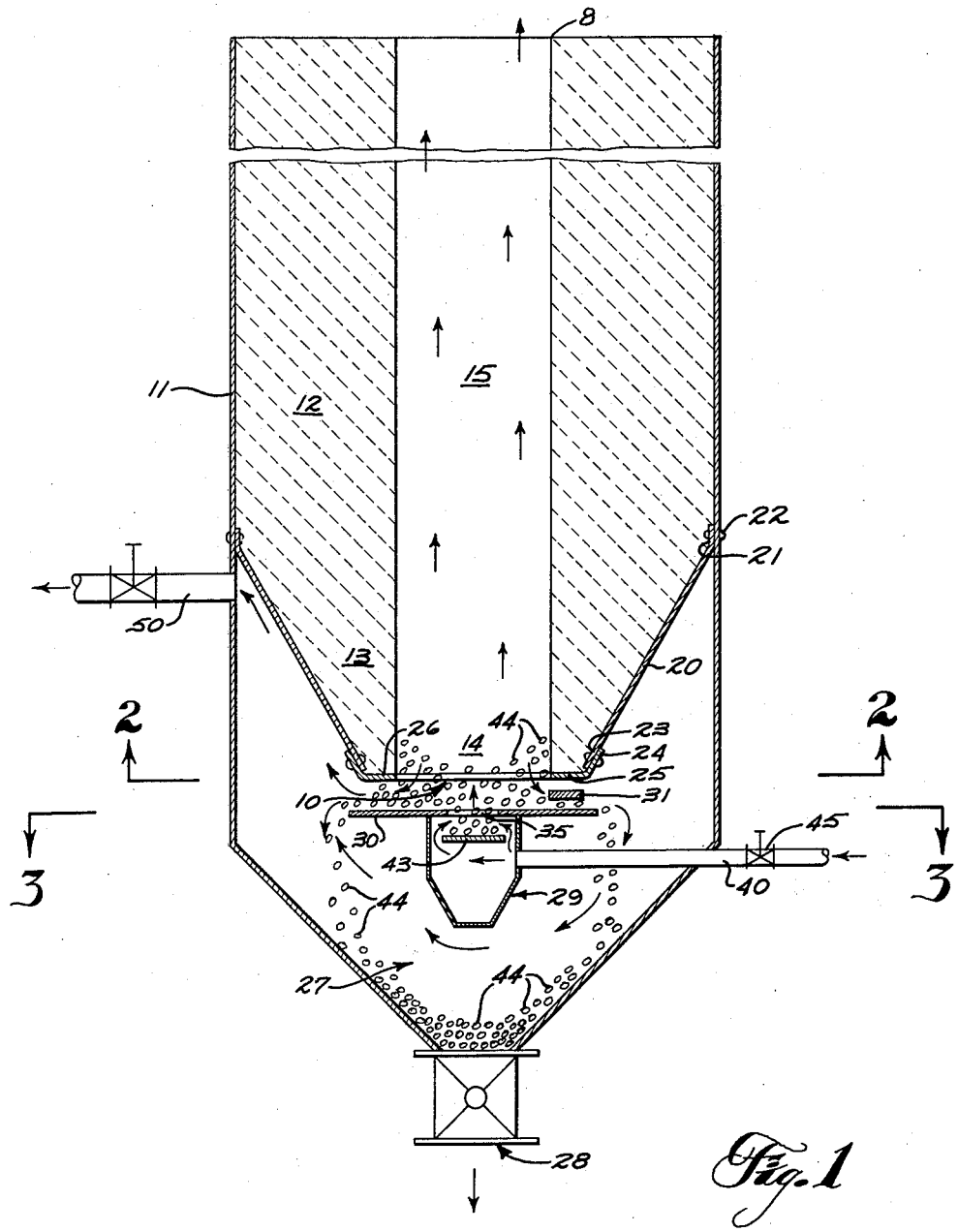
FIG. 1 is a schematic side elevation in partial section of the bottom of a high temperature shaft kiln embodying the concepts of this invention.
Figure 2:
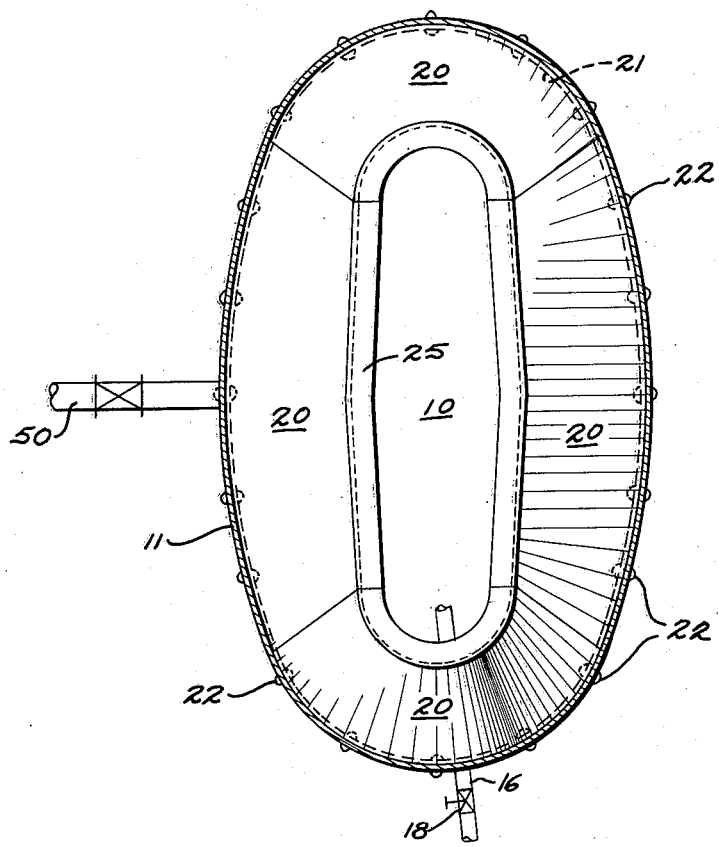
FIG. 2 is a view taken along the line 2—2 of FIG. 1.

In FIG. 1 there is shown the bottom portion of a vertical kiln constructed according to this invention and which is capable of dead burning refractory material above about 3000° F. The kiln includes an upper inlet 8 and a bottom outlet 10 defined by the concentric relatively thin tubular outer shell 11 and the internal refractory lining 12. Refractory lining 12 is of substantial thickness and may be on the order of two or three feet as compared to the about ½ inch thickness for the shell 11. A burner 16 having a suitable valve 18 (FIG. 2) is positioned at the dead burning zone intermediate the ends of the kiln for obtaining temperatures of at least about 3000° F.

A plurality of curved bottom plates 20 are arranged to form an inwardly converging skirt of such dimensions as to contiguously abut and support the downwardly converging outer surface of the truncated bottom portion 13 of the refractory lining 12. The plates 20 have flanges 21 formed about their upper peripheries. The flanges 21 have a plurality of apertures formed therethrough adapted for cooperation with bolts 22, and apertures formed through the shell 11, to support the plates 20. The other end 23 of each of the plates 20 is likewise apertured and arranged to have the upwardly extending ear 24 of the retainer ring 25 bolted thereto. The ring 25 is arranged to contiguously abut and support the bottom face 26 of the conical portion of the lining.

The converging portion 13 of the lining is characterized as a generally downwardly converging truncated elliptical cone 13 having a tubular passage 14 of substantially uniform cross-section passing therethrough. The cross-sectional configuration of the passage through the truncated elliptical cone section of the lining is substantially the same as the cross-sectional configuration of the passage 15 through the refractory lining immediately thereabove.

It is preferred that the slope of the downward convergence of the outer surface of the bottom of the lining be on the order of about 30° relative to the vertical. However, this angle is variable as long as a small lip remains at the bottom to form the surface 26 in order to provide better support for the lining. Alternatively, a plurality of lugs (not shown) may be driven through plates 20 into the cone portion 13 to provide extra support. Of course, a retainer ring and lugs may be used. In a preferred embodiment, the outer shell 11 extends a distance beyond the bottom of the refractory lining and then converges to form a chamber 27 below plates 20, having a bottom outlet 28.

In a preferred construction an air manifold 29 is positioned below the discharge table 30. A drag bar 31 is positioned between the retaining ring 25 and the upper surface of the discharge table 30. Opening through the discharge table are a series of apertures 35 interconnected with the manifold 29 through a plurality of separate conduits 40 (see FIG. 3). A baffle 43, beneath each aperture 35 prevents briquettes 44 from filling the manifold. Each of the conduits 40 has a suitable valve 45 included therein. By suitable manipulation of the valves 45 the cross-sectional configuration of air being introduced into the bottom of the kiln may be adjusted to off-set horizontal non-uniformity in the product temperatures.

By introducing air through a manifold arrangement such as shown in the drawings, it has been found that the average temperature of briquettes being discharged from the bottom of the shaft kiln can be reduced by as much as 500° F. In addition to better cooling of the briquettes, the air is more uniformly preheated by the time it reaches the combustion zone of the kiln. In one campaign production was increased by about 20 percent over construction without the manifold. Also, the product was more uniform.

In order to obtain still further benefits in the foregoing arrangement, an air outlet conduit 50 may open through that portion of the shell 11 below the refractory lining 13. An extra 10 to 50 percent of air, over that blown up through the charge, may thus be introduced into the kiln through the manifold arrangement to further cool the briquettes discharging from the bottom of the kiln. This excess air is then continuously drawn off through conduit 50.

With the downwardly converging, cross-sectionally elongated, elliptical configuration for the bottom of the refractory lining, there is provided greater protection for the sheet steel adjacent the bottom of the kiln. Furthermore, it protects such steel from erosion by preventing direct contact with the downwardly moving charge of hot briquettes. There is provided greater ease of inspection of the critical bottom skirt supporting the lining. One has to but observe the fasteners 22 on the exterior of metal shell 11 in order to determine the condition of the support structure for the refractory lining. If one desired, ports (not shown) may be formed through the shell below the conical skirt 20 for even closer inspection of the interior of the bottom of the kiln.

We have also discovered that less expansion occurs in the metal parts in the lower portion of the kiln with our construction. This is probably due to the additional insulation effect provided by the converging portion of the lining.

Having thus described the invention in detail and with sufficient particularity as to enable those skilled in the art to practice it what we desire to have protected by Letters Patent is set forth in the following claims:

We claim:

1. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned there within to define a vertical passage, means arranged to continuously pass a gas stream in through the bottom outlet and the passage in upwardly moving countercurrent flow to a downwardly moving charge of material to be dead burned, a discharge table spaced beneath the kiln outlet, means positioned above the table and beneath the kiln outlet arranged to assure discharge of material from said table, the bottom of said refractory lining, a substantial distance below the dead burning zone of the kiln, being characterized as a downwardly converging truncated cone having a tubular passage of substantially uniform cross-section passing therethrough, plate means, said plate means carried by the kiln in position to contiguously abut and support the exterior downwardly converging surface of the refractory lining.

2. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned there within to define a vertical passage, a discharge table spaced beneath the kiln outlet, a plurality of apertures formed through the discharge table, manifold means including a plurality of separate compartments, said manifold means supported beneath the discharge table so that each one of its compartments opens through one of the discharge table apertures, means arranged to separately deliver air to each of the separate compartments to thereby pass air through the apertures in the discharge table and through the kiln passage in upwardly moving countercurrent flow to a downwardly moving charge of material to be dead burned, the bottom of said refractory lining, a substantial distance below the dead burning zone of the kiln, being characterized as a downwardly converging truncated cone having a tubular passage of substantially uniform cross-section passing therethrough, means carried by the kiln arranged to support said downwardly converging refractory lining.

3. In a kiln of the type described in claim 2, separate means positioned within each manifold compartment to prevent charge material from entering said compartments.

4. In a kiln of the type described in claim 2, adjustable means carried by said manifold means arranged to adjust the air flow to the separate compartments of the manifold.

5. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned there within to define a vertical passage, a discharge table spaced beneath the kiln outlet, a plurality of apertures formed through the discharge table, manifold means including a plurality of separate compartments, said manifold means supported beneath the discharge table so that each one of its compartments opens to the discharge table apertures, means arranged to deliver air to each of the separate compartments to thereby pass a stream of air upwardly through the discharge table to the kiln passage in upwardly moving countercurrent flow to a downwardly moving charge of material to be dead burned, the bottom of said refractory lining, a substantial distance below the dead burning zone of the kiln, being characterized as a downwardly converging truncated cone having a tubular passage of substantially uniform cross-section passing therethrough, means carried by the kiln arranged to support said downwardly converging refractory lining, said outer metal shell extending a substantial distance below the discharge table to form an enclosed chamber there beneath, a charge outlet from said chamber, an outlet conduit opening through said chamber at a position above the outlet therefrom whereby excess air entering through said manifold means may be vented.

6. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned there within to define a vertical passage, a discharge table spaced beneath the kiln outlet, a plurality of apertures formed through the discharge table, manifold means including a plurality of separate compartments, said manifold means supported beneath the discharge table so that its compartments open through the discharge table apertures, means arranged to separately deliver air to each of the separate compartments to thereby pass air through the apertures in the discharge table and through the kiln passage in upwardly moving countercurrent flow to a downwardly moving charge of material to be dead burned, the bottom of said refractory lining, a substantial distance below the dead burning zone of the kiln, being characterized as a downwardly converging truncated cone having a tubular passage of substantially uniform cross-section passing therethrough, means carried by the kiln arranged to support said downwardly converging refractory lining.

7. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned there within to define a vertical passage, a discharge table spaced beneath the kiln outlet, a plurality of apertures formed through the discharge table, manifold means including a plurality of separate compartments, said manifold means supported beneath the discharge table so that each one of its compartments opens through one of the discharge table apertures, means arranged to separately deliver air to each of the separate compartments to thereby pass air through the apertures in the discharge table and through the kiln passage in upwardly moving countercurrent flow to a downwardly moving charge of material to be dead burned.

8. In a vertical kiln of the type described in claim 1, said plate means consisting of a plurality of metal plates, said plates affixed at one end to the interior surface of the outer metal shell in position to contiguously abut and support the exterior downwardly converging surface of the refractory lining.

9. In a vertical kiln of the type described in claim 1, there being a substantially flat surface about the bottom of the refractory lining forming the outlet, said plate means consisting of a plurality of metal plates, said plates affixed at one end to the interior surface of the outer metal shell in position to contiguously abut and support the exterior downwardly converging surface of the refractory lining, and retainer ring means carried by the other end of said plates contiguously abutting said substantially flat surface about the bottom outlet of said refractory lining.

10. In a kiln of the type described in claim 7, separate means positioned within with each of the separate compartments to prevent charge material from entering said compartments.

11. In a kiln of the type described in claim 7, adjustable means carried by said manifold means arranged to separately adjust the air flow to the separate compartments of the manifold.

12. In a vertical kiln of the type capable of dead burning refractory material above about 3000° F., said kiln including means defining an upper inlet and a bottom outlet, means positioned at a dead burning zone located intermediate the ends of the kiln arranged to obtain a temperature of at least about 3000° F. in said dead burning zone, a tubular outer shell having a relatively thick refractory lining contiguously positioned therein to define a vertical passage, a discharge table spaced beneath the kiln outlet, a plurality of apertures formed through the discharge table, manifold means including a plurality of separate compartments, said manifold means supported beneath the discharge table so that at least one of its compartments opens through each one of the discharge table apertures, means arranged to deliver air to each of the separate compartments to thereby pass a stream of air upwardly through the discharge table to the kiln passage in upwardly moving countercurrent flow to a downwardly moving charge of material to be dead burned, shell means forming a chamber positioned about the bottom of said kiln arranged to provide for collection of dead burned material discharging from said table, means forming an outlet conduit opening from said shell means, and means forming a dead burned material discharge outlet opening from said chamber at a position below said outlet conduit, said outlet conduit normally open to the atmosphere whereby excess air entering through said manifold means may be vented to the atmosphere.

References Cited by the Examiner

UNITED STATES PATENTS

| 484,999 | 10/92 | Curtis et al. | 50—160 X |
|---|---|---|---|
| 696,420 | 3/02 | Dougherty | 214—18 |
| 704,806 | 8/02 | Jamieson | 50—113 |
| 1,586,318 | 5/26 | Mabee | 263—29 |
| 2,628,829 | 2/53 | Ruiz | 263—29 |
| 2,938,782 | 5/60 | Toulmin | 266—25 X |
| 2,951,756 | 9/60 | Cavanagh | 266—25 X |
| 3,003,756 | 10/61 | Steffensen | 263—29 |

FOREIGN PATENTS 602,653 12/25 France.

CHARLES SUKALO, Primary Examiner.

JOHN J. CAMBY, Examiner.